United States Patent [19]

Klepsch

[11] Patent Number: 5,809,750

[45] Date of Patent: Sep. 22, 1998

[54] METHOD OF SEALING CONTAINERS WITH PEELABLE, HEAT SEALABLE FOIL

[76] Inventor: Liliana Klepsch, Weimarerstrasse 77, A-1190 Vienna, Austria

[21] Appl. No.: 843,158

[22] Filed: Apr. 11, 1997

Related U.S. Application Data

[62] Division of Ser. No. 576,836, Dec. 21, 1995, which is a continuation of Ser. No. 94,202, Oct. 8, 1993, abandoned.

[30] Foreign Application Priority Data

Feb. 24, 1992 [AT] Austria ........................ 345/92

[51] Int. Cl.$^6$ .................................................. B65B 51/10
[52] U.S. Cl. .............................. 53/478; 53/485; 53/137.2
[58] Field of Search ..................... 53/478, 477, 485, 53/136.3, 137.2, 473; 428/35.7

[56] References Cited

U.S. PATENT DOCUMENTS

| | | |
|---|---|---|
| 4,080,407 | 3/1978 | Fodor ........................................ 260/880 |
| 4,104,326 | 8/1978 | Fodor ........................................ 260/876 |
| 4,366,662 | 1/1983 | Katsura et al. ............................. 53/478 |
| 4,870,134 | 9/1989 | Hwo et al. ................................. 428/516 |
| 5,024,888 | 6/1991 | Hwo et al. ................................. 428/355 |
| 5,066,543 | 11/1991 | Hwo et al. ................................. 428/412 |
| 5,257,491 | 11/1993 | Rouyer et al. ............................. 53/473 |
| 5,281,453 | 1/1994 | Yamada et al. ........................... 428/35.7 |
| 5,474,855 | 12/1995 | Antheunisse ............................. 428/515 |

FOREIGN PATENT DOCUMENTS 0251636 1/1988 Japan .

*Primary Examiner*—James F. Coan
*Assistant Examiner*—Gene L. Kim
*Attorney, Agent, or Firm*—Kane,Dalsimer,Sullivan, Kurucz, Levy, Eisele and Richard, LLP

[57] ABSTRACT

A peelable, heat-sealable foil for closing containers, for example cups, of synthetic plastics material, in particular polystyrene, consists of one single, biaxially oriented layer of impact-resistant polystyrene, and in particular of impact-resistant polystyrene in admixture with a styrene-butadiene-di-blockcopolymer.

11 Claims, No Drawings

METHOD OF SEALING CONTAINERS WITH PEELABLE, HEAT SEALABLE FOIL

This is a divisional application of application Ser. No. 08/576,836, filed Dec. 21, 1995 which in turn is a continuation application of U.S. application Ser. No. 08/094,202, now abandoned filed on Oct. 8, 1993.

The invention refers to a peelable, heat-sealable foil of impact-resistant polystyrene for closing containers, for example cups, of synthetic plastics material.

Containers of plastics material, which contain foodstuffs, must, as a rule, be air-tightly closed for reliably preserving the foodstuffs. Also other articles are frequently offered in plastics containers being closed by a foil.

For example it is known for a long time to close cups containing dairy products, such as cream, sweet cream, yoghurt or the like, by an aluminum foil, which is being connected with the rim of the cup by means of a heat-sealing varnish. In this case, the disadvantage results in the high energy consumption required for producing the aluminum.

There has already also been proposed to close such containers with foils of synthetic plastics material, for example polyester foils or foils of hard PVC, equally being connected with the rim of the container by means of a heat-sealing varnish. Also the use of such foils is expensive on account of the required heat-sealable varnish. The same disadvantage is also encountered when using as closure means laminates of paper and polyester, which laminates are equally connected with the rim of the container by means of a heat-sealable varnish. Furthermore, the residual solvents having its origin in the sealing layer can be removed from the synthetic plastics material only with considerable expenditure.

In the dairy industry, the containers consist as a rule of polystyrene or polypropylene. The described foils then consist of an alien material. Recently, efforts are undertaken in numerous countries to collect used containers and to recycle such containers. Such recycling is in case of closing foils consisting of an alien material either extremely expensive or not possible at all, because the closing foil remains, as a rule, adhering on the container rim and the consumer can not be expected to completely remove this closing foil prior to collecting the containers.

For this reason, it has already been proposed to produce a closing foil of polystyrene, so that the container and the closing foil consist of materials of the same type and are thus suitable to be subjected in common to a recycling process and separation of the closing foil from the container is not necessary. Such heat-sealable foils, i.e. foils being suitable to be connected with the rim of the container without the use of a heat-sealing varnish are, however, required to be operable at a sealing temperature preventing adhesion of the foil on the sealing tool, on the one hand, and to reliably provide a sufficient connecting between the foil and the container rim, on the other hand, and to be in spite thereof easily be peelable off the container rim for the purpose of opening the container.

From the DE-OS 39 21 677 there has already become known a sealable foil of synthetic plastics material which consists of at least two, preferably of three, layers, i.e. of a heat-sealable polystyrene layer, of a main layer of highly impact-resistant polystyrene and equally of a heat-protecting layer of a substantially more heat-resistant synthetic plastics material than polystyrene, for example PBT. This heat-protective layer serves the purpose to prevent any adhesion of the foil on the sealing tool and to prevent flowing aside of the underlying polystyrene layers under the action of the pressure and of the temperature of the sealing tool.

It is a drawback that such foils being composed of a plurality of foils must be produced in a relatively expensive manner according to the co-extrusion process and tend to delamination when peeling off the foil, in particular in case of low thicknesses of the foils of, for example, 0.12 mm.

The present invention has as an object to avoid the mentioned drawbacks and to provide a peelable and heat-sealable foil of impact-resistant polystyrene for closing containers of synthetic plastics material, which foil can easily be manufactured, has the strength required for resisting the stress in particular during transport, can be given a small thickness for the purpose of performing the sealing operation in a rapid manner at a lower temperature as compared with known foils for the purpose of preventing adhesion on the sealing tool and can easily be peeled off the container without any tendency to tearing when being peeled off. For solving this task, the invention proposes that the foil consists of one single, biaxially oriented layer.

For the purpose of providing the biaxial orientation, the impact-resistant polystyrene foil, which is preferably produced according to the extrusion process, is stretched in two directions, whereby the random arrangement of the fibrous polystyrene molecules becomes oriented and the impact resistance and the stiffness of the foil is substantially improved as compared with a foil having not been biaxially oriented. Such a foil can thus be given a small thickness and in spite thereof reliably be given the required strength, thus being in the position to operate the sealing process at lower temperatures at which no special precautions must be made for preventing adhesion of the foil on the sealing tool. On account of the biaxial orientation, the strength of the foil is maintained to a sufficient degree even within the sealing area being weakened by notches, so that the foil is not subjected to tearing when being peeled from the container rim in spite of the required tension force and thus can be peeled off as a single piece.

It has proved convenient that the foil consists of impact-resistant polystyrene in admixture with a styrene-butadiene-di-blockcopolymer. On account of the finely divided lamellar structure of the butadiene phase of the styrene-butadiene-blockcopolymer, there is formed a sealing component already at low temperatures, which component can be removed when peeling off the cover, provided that the foil has been correspondingly strengthened by being given a biaxial orientation.

The foil preferably consists of 20 percent by weight to 98 percent by weight of impact-resistant polystyrene and of 2 percent by weight to 80 percent by weight of styrene-butadiene-di-blockcopolymer.

As a raw material for producing the biaxially oriented foil has been well proved, for example, highly impact-resistant polystyrene containing butadiene in a proportion of 8 percent, having a VICAT-number of 95° C. (DIN 53460 process A) and having a melt index of 3 g/10 min (according to DIN 53735, 200°/5 kp), said highly impact-resistant polystyrene having been mixed with approximately 15 percent of a styrene-butadiene-di-block copolymer.

The optimum thickness of the foil is within the range between 0.08 mm and 0.06 mm.

The temperature of the sealing head is conveniently in the range between 150° and 170°, the specific sealing pressure being between 4 and 50 bar.

The foil according to the invention is, as a rule, unobjectionably removable from a sealing tool being provided with a layer of PTFE. Even when using sealing tools of steel or bronze, which tools are not covered, there is observed an only low, non-disturbing adhesion when observing the mentioned temperatures. On account of the foil being, as a rule, printed according to the offset printing process or the flexo printing process without any pretreatment the use of a heat-protecting varnish for protecting the colors within the sealing area is of advantage. The overlying covering varnish, which is, as a rule, applied in one single machine operation together with the imprinting, equally facilitates removal from a non-covered sealing tool.

The inventive cover foil seals also against A-PET and PVC.

In the following, there are provided those results which were obtained during three sealing tests made with cover members out of an inventive foil having an original thickness of 80 μm, the diameter of the cover members being 65 mm with a width of the sealing web of 3 mm.

| Sealing force | 200 kp | 200 kp | 200 kp |
|---|---|---|---|
| Sealing temperature | 160° | 165° | 170° |
| Sealing time | 0.70 s | 0.70 s | 0.70 s |
| Peelability (100% Evaluation 5 0% Evaluation 0) | 5 | 5 | 5 |
| Bursting pressure (minimum 300 mbar) | 344 | 374 | 358 |
| | 334 | 365 | 371 |
| | 350 | 347 | 354 |
| | 356 | 386 | 323 |
| | 323 | 360 | 368 |
| Average | 341 | 366 | 355 |
| Opening force (minimum: 3N maximum: 10N) | 3.84 | 9.47 | 9.24 |
| | 7.46 | 7.34 | 8.81 |
| | 6.88 | 9.31 | 8.60 |
| | 8.97 | 3.17 | 8.15 |
| | 7.52 | 9.31 | 4.11 |
| Average value | 6.93 | 7.72 | 7.78 |

I claim:

1. A method of closing a synthetic plastic container having a rim, comprising heat sealing a cover comprising a peelable, heat-sealable foil of impact resistant polystyrene onto the rim of the container, wherein the foil consists of a single, biaxially oriented layer of impact-resistant polystyrene in admixture with styrene-butadiene-di-block copolymer, whereby the foil is easily peelable off the rim and not subject to tearing when being peeled from the rim.

2. A method according to claim 1, wherein said foil consists of 20% by weight to 98% by weight impact-resistant polystyrene and of 2% by weight to 80% by weight styrene-butadiene-di-block copolymers.

3. The method according to claim 1, wherein said container is a cup.

4. The method according to claim 1, further comprising sealing the container of synthetic plastic material at a temperature between about 150° C. and 170° C. and a specific sealing pressure between 4 and 50 bar.

5. A method according to claim 1 wherein the sealing between the rim of the container and the container cover is in the absence of heat sealing varnish.

6. A method of closing a synthetic plastic container having a rim, comprising heat sealing a cover comprising a peelable, heat-sealable foil of impact resistant polystyrene onto the rim of the container, wherein the foil consists of a single, biaxially oriented layer of impact-resistant polystyrene in admixture with styrene-butadiene-di-block copolymer, whereby the foil is easily peelable off the rim and not subject to tearing when being peeled from the rim, said foil comprising 20% by weight to 98% by weight impact-resistant polystyrene and of 2% by weight to 80% by weight styrene-butadiene-di-block copolymer.

7. A method of closing a synthetic plastic container having a rim, comprising a) heat sealing a cover comprising a peelable, heat-sealable foil of impact resistant polystyrene onto the rim of the container, wherein the foil consists of a single, biaxially oriented layer of impact-resistant polystyrene in admixture with styrene-butadiene-di-block copolymer; and b) contacting the rim of the container to the container cover to form a peelable heat-sealable effect.

8. The method according to claim 7 wherein the sealing is conducted at at a temperature between about 150° C. and 170° C. and a specific sealing pressure between 4 and 50 bar.

9. A method according to claim 7, wherein the sealing between the rim of the container and the container cover is in the absence of heat sealing varnish.

10. A method according to claim 7, wherein said foil consists of 20% by weight to 98% by weight impact-resistant polystyrene and of 2% by weight to 80% by weight styrene-butadiene-di-block copolymers.

11. The method according to claim 1, wherein said container is a cup.

* * * * *

UNITED STATES PATENT AND TRADEMARK OFFICE
CERTIFICATE OF CORRECTION

PATENT NO. : 5,809,750
DATED : September 22, 1998
INVENTOR(S) : Liliana Klepsch

It is certified that error appears in the above-identified patent and that said Letters Patent is hereby corrected as shown below:

On the title page, Item [76], please correct the inventor's address to read as follows:

WeimarerstraBe 77, A-1190 Vienna, Austria

On the title page, Item [62], please correct the Related U.S. Application Data to read as follows:

Division of Ser. No. 576,838, Dec. 21, 1995, which is a continuation of Ser. No. 94,202, Oct. 8, 1993, abandoned.

Signed and Sealed this

Twenty-second Day of December, 1998

Attest:

BRUCE LEHMAN

*Attesting Officer*　　　*Commissioner of Patents and Trademarks*